(12) United States Patent
Sugita et al.

(10) Patent No.: US 9,218,794 B2
(45) Date of Patent: Dec. 22, 2015

(54) IMAGE PROCESSING APPARATUS, IMAGE PROCESSING METHOD, AND NON-TRANSITORY COMPUTER READABLE MEDIUM

(71) Applicant: KABUSHIKI KAISHA TOSHIBA, Tokyo (JP)

(72) Inventors: Kaoru Sugita, Saitama-ken (JP); Masahiro Sekine, Tokyo (JP); Masashi Nishiyama, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/186,178

(22) Filed: Feb. 21, 2014

(65) Prior Publication Data
US 2014/0240222 A1 Aug. 28, 2014

(30) Foreign Application Priority Data
Feb. 22, 2013 (JP) ................................. 2013-033731

(51) Int. Cl.
G06F 3/00 (2006.01)
G09G 5/377 (2006.01)
G06Q 30/06 (2012.01)

(52) U.S. Cl.
CPC ............... *G09G 5/377* (2013.01); *G06F 3/005* (2013.01); *G06Q 30/0621* (2013.01); *G06Q 30/0643* (2013.01); *G09G 2370/20* (2013.01)

(58) Field of Classification Search
CPC ..... G09G 5/377; G06Q 30/0278; G06F 3/005

USPC .......................................................... 345/633
See application file for complete search history.

(56) References Cited

U.S. PATENT DOCUMENTS

| | | | |
|---|---|---|---|
| 2011/0216075 A1* | 9/2011 | Shigeta et al. ................. | 345/473 |
| 2012/0162256 A1* | 6/2012 | Chen et al. .................... | 345/633 |
| 2013/0033591 A1 | 2/2013 | Takahashi et al. | |

FOREIGN PATENT DOCUMENTS

| | | |
|---|---|---|
| JP | 2006-135876 | 5/2006 |
| JP | 2012-108805 | 6/2012 |
| JP | 2013-37445 | 2/2013 |

OTHER PUBLICATIONS

Sugita et al., U.S. Appl. No. 13/941,895, filed Jul. 15, 2013.
Sugita et al., U.S. Appl. No. 13/933,282, filed Jul. 2, 2013.

* cited by examiner

*Primary Examiner* — Michael Pervan
(74) *Attorney, Agent, or Firm* — Nixon & Vanderhye, P.C.

(57) ABSTRACT

According to one embodiment, a photographing image including a user region is acquired. The user region is detected from the photographing image. The user region in the photographing image is changed so that a user's direction in the user region cannot be decided, and the photographing image in which the user region is changed is acquired as a change image. A position of the user region in the photographing image is calculated. An image of a back side-cloth is compounded with the user region in the change image at the position.

7 Claims, 10 Drawing Sheets

| IMAGE ID | KIND | TRADE NAME | DIRECTION | IMAGE DATA |
|---|---|---|---|---|
| 1 | COAT | A COAT | FRONT |  |
| 2 | COAT | A COAT | BACK |  |
| 3 | SKIRT | B SKIRT | FRONT |  |
| 4 | SKIRT | B SKIRT | BACK |  |
| ⋮ | ⋮ | ⋮ | ⋮ | ⋮ |

| IMAGE ID | KIND | TRADE NAME | DIRECTION | IMAGE DATA |
|---|---|---|---|---|
| 1 | COAT | A COAT | 0° |  |
| 2 | COAT | A COAT | 30° |  |
| 3 | COAT | A COAT | 150° |  |
| 4 | COAT | A COAT | 180° |  |
| 5 | SKIRT | B SKIRT | 0° |  |
| ⋮ | ⋮ | ⋮ | ⋮ | ⋮ |

IMAGE PROCESSING APPARATUS, IMAGE PROCESSING METHOD, AND NON-TRANSITORY COMPUTER READABLE MEDIUM

CROSS-REFERENCE TO RELATED APPLICATION

This application is based upon and claims the benefit of priority from Japanese Patent Application No. 2013-033731, filed on Feb. 22, 2013; the entire contents of which are incorporated herein by reference.

FIELD

Embodiments described herein relate generally to an image processing apparatus, an image processing method, and a non-transitory computer readable medium.

BACKGROUND

As to an image of a cloth (cloth image) for a user who desires to fit, by compounding an image photographing the user (photographing image) with the cloth image, an image processing apparatus for displaying a fitting image is widely used. In such image processing apparatus, for example, by photographing a user standing in front of a digital signage (having a camera) with the camera, this photographing image is displayed on the digital signage. Then, by compounding a cloth image (selected by the user) with a user region of the photographing image, the fitting image is displayed.

However, in order for the user to confirm his/her fitting image, the user must stand facing the digital signage. Accordingly, in a virtual fitting apparatus of conventional technique, when a cloth image of a back half body is compounded with a photographing image, the cloth image is compounded with a front half body of a user of the photographing image. As a result, this fitting image feels uncomfortable for the user.

DETAILED DESCRIPTION

According to one embodiment, an image processing apparatus includes an acquisition unit, a detection unit, a change unit, a calculation unit, and a composition unit. The acquisition unit is configured to acquire a photographing image including a user region. The detection unit is configured to detect the user region from the photographing image. The change unit is configured to acquire a change image by changing the user region in the photographing image so that a user's direction in the user region cannot be decided. The calculation unit is configured to calculate a position of the user region in the photographing image. The composition unit is configured to compound an image of a back side-cloth with the user region in the change image at the position.

Various embodiments will be described hereinafter with reference to the accompanying drawings.

The First Embodiment

Figure 1:
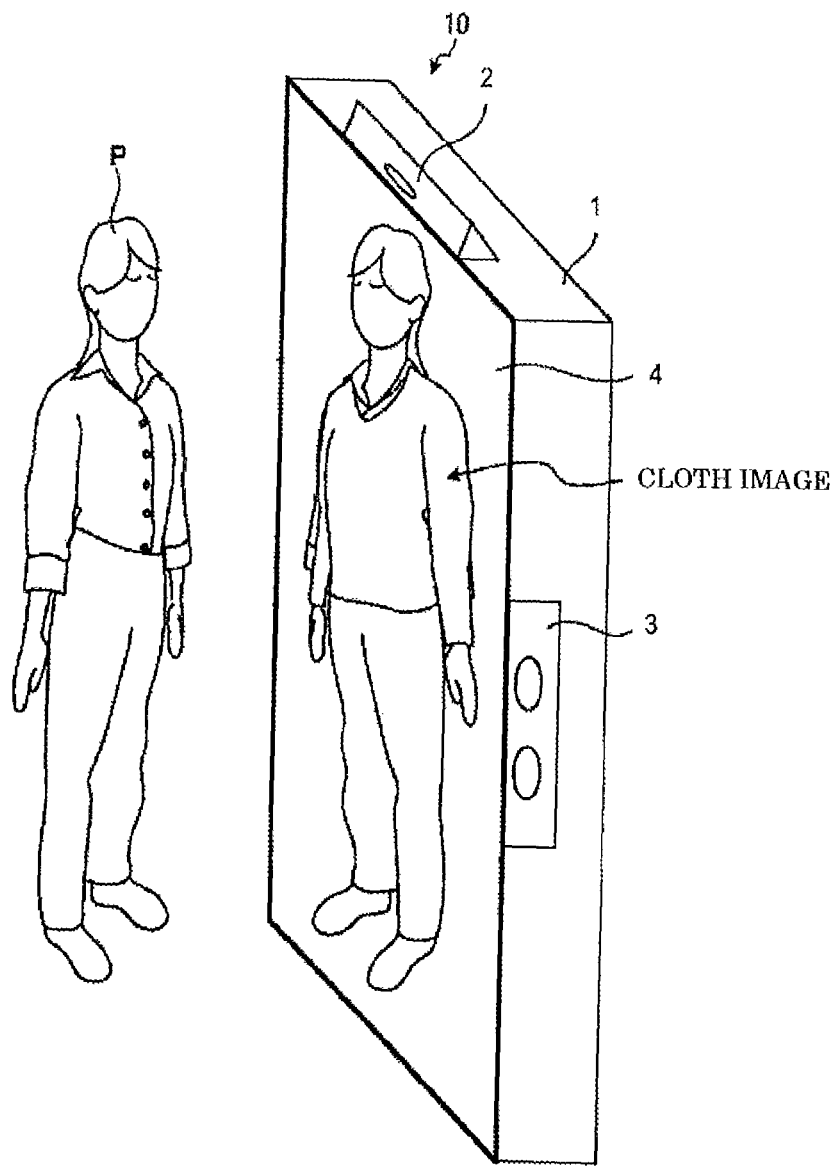
FIG. 1 is one example of usage situation of an image processing apparatus 1 according to the first embodiment.

FIG. 1 is one example of usage situation of an image processing apparatus 1 according to the first embodiment. The image processing apparatus 1 is suitable for a virtual fitting system 10 to compound an image of a cloth (cloth image) for a user P who desires to fit with an image photographing the user P (photographing image). The virtual fitting system 10 can be used as a digital signage with a camera located at a store to sell clothes.

In the image processing apparatus 1, as to a photographing image on which the user P of the virtual fitting system 10 is frontally photographed, in order not to decide a direction of the user P, a change image in which a luminance of a region of the user P is changed is obtained. The image processing apparatus 1 calculates a position of the user in the photographing image, and generates a fitting image by compounding an image (back cloth image) of back side of a cloth (back side-cloth) with a second image. As a result, irrespective of the direction of the user P, the fitting image having no uncomfortable feeling for the user P can be generated.

Figure 2:
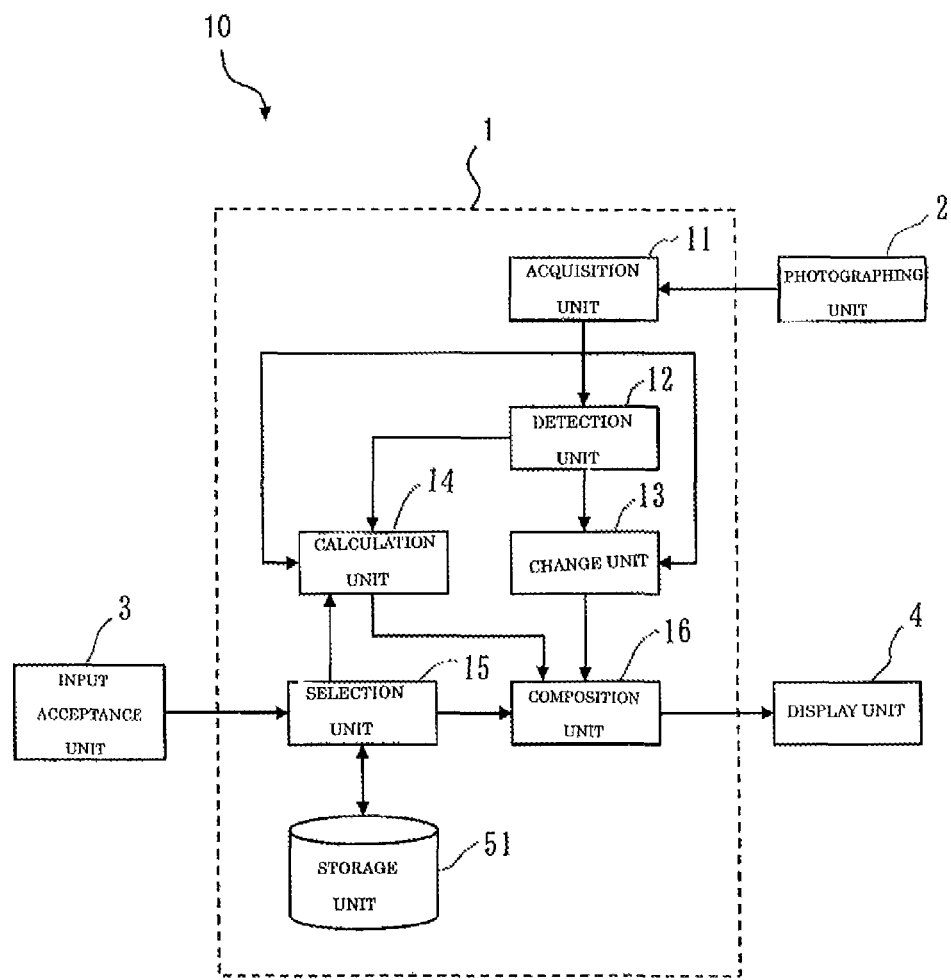
FIG. 2 is a block diagram of the image processing apparatus 1.

FIG. 2 is a block diagram of the virtual fitting system 10. The virtual fitting system 10 includes the image processing apparatus 1, a photographing unit 2, an input acceptance unit 3, and a display unit 4. The photographing unit 2 obtains a photographing image by photographing the user P who stands facing the virtual fitting system 10. The photographing unit 2 may photograph the user P at a predetermined interval. The photographing unit 2 supplies photographing images of which photographing times are different to the image processing apparatus 1 in order. By continually photographing the user P and by supplying the photographing images to the image processing apparatus 1 (by the photographing unit 2), the image processing apparatus 1 can acquire a moving image comprising a plurality of photographing images of which photographing times are different.

The display unit 4 displays a fitting image compounded by the image processing apparatus 1 (explained afterwards). The input acceptance unit 3 accepts an input to designate a cloth image for the user P who desires to fit, or another input operation.

The image processing apparatus 1 includes an acquisition unit 11, a detection unit 12, a change unit 13, a calculation unit 14, a selection unit 15, a composition unit 16, and a storage unit 51. The acquisition unit 11, the detection unit 12, the change unit 13, the calculation unit 14, the selection unit 15, and the composition unit 16, may be realized by a central processing unit (CPU) and a memory used thereby. The storage unit 51 may be realized by the memory or an auxiliary storage.

The acquisition unit 11 acquires photographing images photographed by the photographing unit 2.

The detection unit 12 detects a region of the user P (user region) in the photographing image. For example, the detection unit 12 may detect a user region by deciding a face region of the user P. Furthermore, the detection unit 12 may detect the user region in the photographing image by comparing a background image (previously photographed without the user P) with the photographing image for each pixel. Furthermore, by using a distance sensor (not shown in FIG. 2) able to measure a distance from the virtual fitting system 10 to the user P, the user region may be detected. Furthermore, another technique to detect a person region in the image may be used.

The change unit 13 changes a luminance of the user region so that a direction of the user P cannot be decided.

The calculation unit 14 calculates a position of the user region on the photographing image. In the first embodiment, based on a kind of a back cloth image selected by the selection unit 15 (explained afterwards), the calculation unit 14 calculates a position of a feature region (for example, a shoulder region or a waist region) of the user P as the position of the user region.

Figure 3:
FIG. 3 is one example of image data stored in a storage unit 51 in FIG. 2.
Figure 3:
Figure 3:
Figure 3:

The storage unit 51 stores a plurality of images (back cloth images) of back side of clothes (back side-clothes). FIG. 3 is one example of image data stored in the storage unit 51. As to each image data, "image ID", "kind" of cloth represented by the image data, "trade name" of cloth represented by the image data, and "direction" of cloth represented by the image data, are corresponded. Here, image data of which direction is "back" is a back cloth image. In the storage unit 51 of the first embodiment, a front cloth image as an image of front side of a cloth is stored with the back cloth image. In FIG. 3, image data of which direction is "front" is the front cloth image.

Based on an input operation from the user P by the input acceptance unit 3, the selection unit 15 selects and extracts image data from the storage unit 51. In the first embodiment, an example that the selection unit 15 extracts a back cloth image from the storage unit 51 by the user P's input operation will be explained.

The composition unit 16 compounds the back cloth image (extracted) with the change image at a position corresponding to the user region, and generates the fitting image.

Thus far, component of the image processing apparatus 1 was explained.

Figure 4:
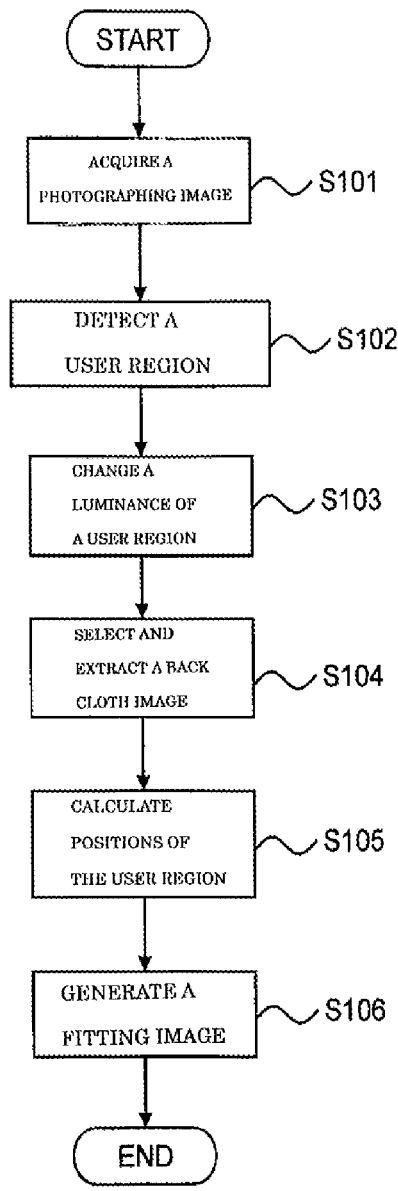
FIG. 4 is a flow chart of processing of the image processing apparatus 1.
Figure 5:
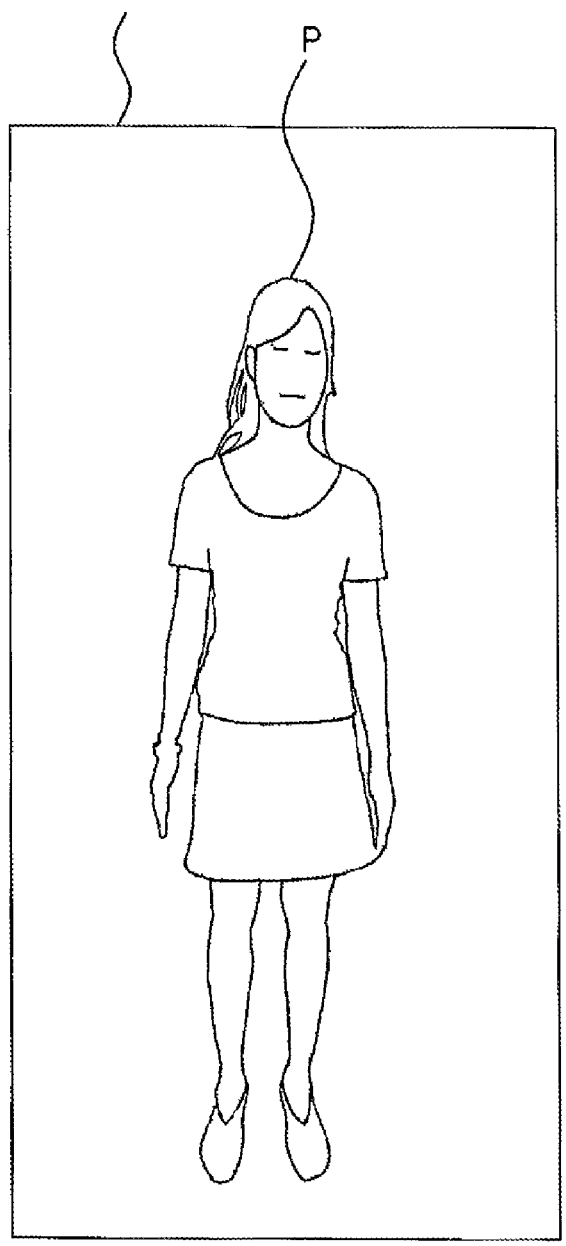
FIG. 5 is one example of a photographing image including a user P.

FIG. 4 is a flow chart of processing of the image processing apparatus 1. The acquisition unit 11 acquires a photographing image from the photographing unit 2 (S101). FIG. 5 is one example of the photographing image including the user P. In the first embodiment, as shown in FIG. 1, the virtual fitting system 10 including the photographing unit 2 and the display unit 4 as one body is supposed. Accordingly, the user P is photographed on condition that he/she frontally faces to the virtual fitting system 10.

The acquisition unit 11 supplies the photographing image to the detection unit 12, the change unit 13 and the calculation unit 14.

The detection unit 12 detects a user region in the photographing image (S102). The detection unit 12 supplies information of the user region to the change unit 13 and the calculation unit 14.

Figure 6:
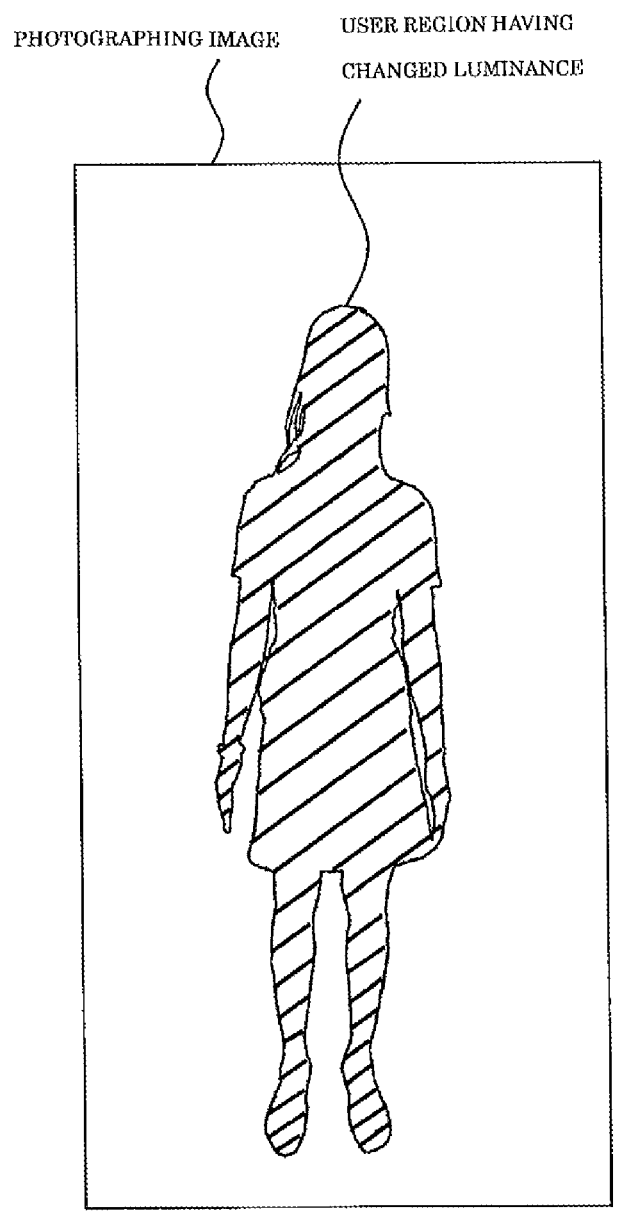
FIG. 6 is one example of the photographing image in which a luminance of a user region is changed.

The change unit 13 changes a luminance of the user region so that a direction of the user P cannot be decided (S103). FIG. 6 is one example of the photographing image in which a luminance of the user region is changed. In FIG. 6, a region having oblique lines represents the user region of which luminance is changed. For example, the change unit 13 may change the luminance so that the user region in the photographing image is silhouetted as single color such as black. Furthermore, the change unit 13 may change the luminance so that the luminance is continually changed from one side of the user region to the other side thereof in the photographing image. Furthermore, the change unit 13 may change the luminance so that the user region is shaped by stripe or lattice of black and white. Furthermore, the change unit 13 may change the luminance so that irregularity of the user is represented by shading.

Except for above change methods, if only the direction of the user P cannot be decided, the change unit 13 may change the luminance of the user region by any method.

By the user P's input operation (for example, designation of trade name), the selection unit 15 selects and extracts a back cloth image corresponding to the input operation from the storage unit 51 (S104).

The calculation unit 14 calculates a position of the user region on the photographing image (S104). In the first embodiment, the calculation unit 14 calculates a position of a feature region of the user P as a position of the user region. The feature region is a region from which a shape of the user P can be estimated. As the feature region of the user P, a shoulder region corresponding to a shoulder of human body and a waist region corresponding to a waist thereof, are used. Here, the feature region is not limited to them.

Furthermore, in the first embodiment, based on a kind of a cloth corresponding to the back cloth image selected by the selection unit 15, the calculation unit 14 calculates a position of the feature region of the user P. For example, if the selection unit 15 extracts a back cloth image of "coat", the calculation unit 14 sets a position of shoulder region to the feature region.

The composition unit 16 compounds the back cloth image (extracted) with the change image at a position corresponding to the user region (calculated), and generates a fitting image (S106). In the first embodiment, the compound unit 16 compounds the back cloth image (extracted by the selection unit 15) with the change image so that a feature region of the back cloth image is matched with a feature region of the user P of the change image, and generates the fitting image. The composition unit 16 supplies the fitting image to the display unit 4.

Figure 7:
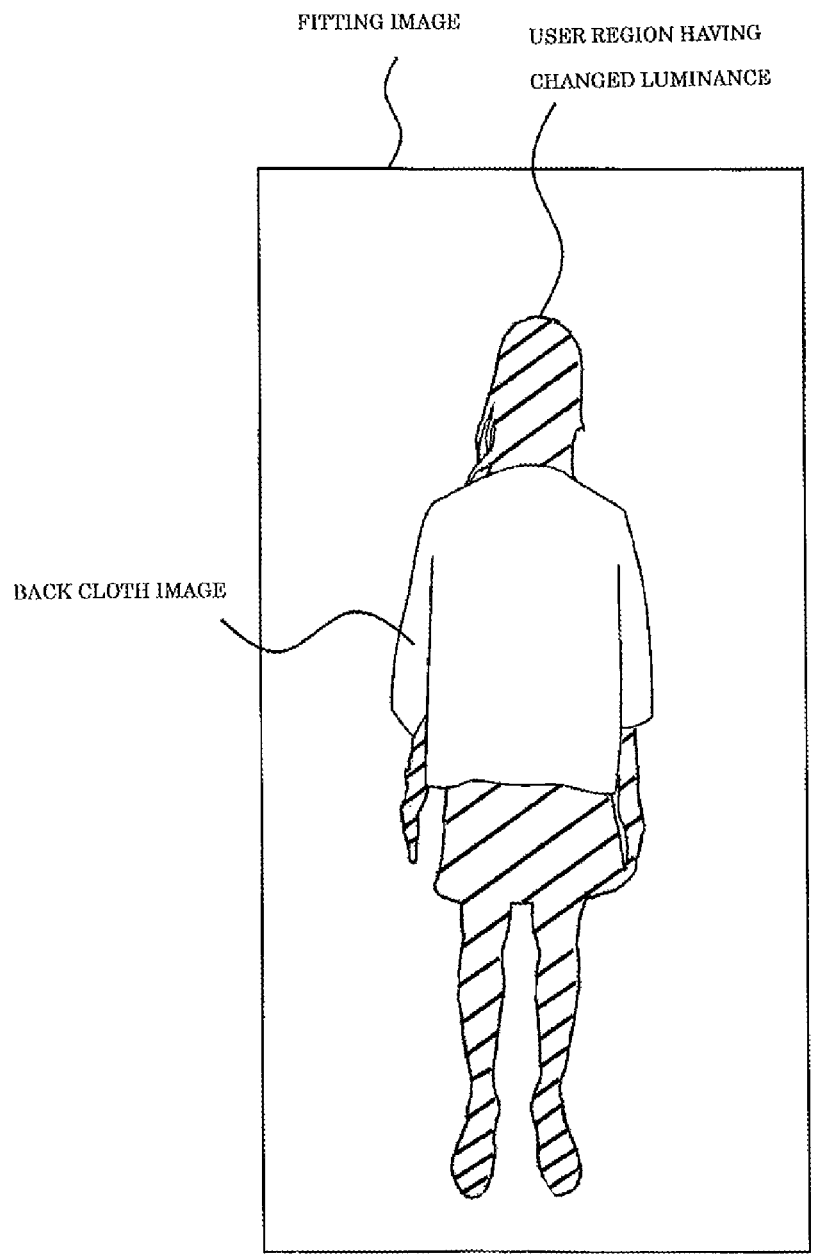
FIG. 7 is one example of a fitting image.

FIG. 7 is one example of the fitting image. As shown in FIG. 7, by compounding the back cloth image with the photographing image of which luminance of the user region is changed, even if the photographing image shows the user frontally facing, the fitting image including the back cloth image without uncomfortable feeling for the user can be generated.

Thus far, processing of the image processing apparatus 1 was explained.

Moreover, the image processing apparatus 1 may further includes a recording unit (not shown in FIG. 2) to record a back image of the user P when the user P turns backward from the apparatus 1. In this case, the change unit 13 may compound the back image (recorded) with the user region of the photographing image. Whether the user P turns backward can be decided by recognizing a face region in the photographing image.

Furthermore, if depth information (three-dimensional information) of the user P can be acquired using a distance sensor (such as depth sensor) of the photographing unit 2, the change unit 13 can generate aback image by observing the user P from a position where an elevation angle or a depression angle is added to the photographing position.

In above explanation of the first embodiment, the photographing image (obtained by the photographing unit 2) is displayed with right and left inversion by the display unit 4, and the user P can observe situation that the user P is photographed from the back side. However, the photographing image may be displayed without right and left inversion. This case equivalents to a situation that the user P's back frontally faces the photographing unit 2, and only the user P's head is frontally turned to the photographing unit 2 in order to observe himself/herself.

The input acceptance unit 3 is means for the user to perform various input operations. For example, the input acceptance unit 3 is image/speech recognition device such as a mouse, a button, a remote controller, a keyboard, a microphone, or combination thereof. Furthermore, if the image recognition device is used as the input acceptance unit 3, the user's body gesture or hand gesture in front of the input acceptance unit 3 may be accepted as various kinds of the user's input operation. In this case, the image recognition device previously stores designation information corresponding to each motion of body gesture or hand gesture. By reading the designation information corresponding to the body gesture or hand gesture recognized, the user's input operation is accepted.

Furthermore, the input acceptance unit 3 may be a communication device to receive a signal representing the user's input operation from an external device which sends various information of mobile terminal and so on. In this case, the input acceptance unit 3 accepts the signal representing input operation (received from the external device) as the user's input operation.

Moreover, the input acceptance unit 3 and the display unit 4 may be composed as one body. Specifically, the input acceptance unit 3 and the display unit 4 may be composed as UI (User Interface) preparing both input function and display function. As the UI, LCD (Liquid Crystal Display) having touch panel is used.

In above explanation of the first embodiment, the user P (person) is a subject of the photographing image. However, the subject is not limited to a person. The subject may be an object fitting a cloth, for example, a living thing or non-living thing. For example, the living thing is the human. However, the living thing is not limited to the human. The living thing may be a pet such as a dog or a cat. Furthermore, the non-living thing is a mannequin imitating shape of the human body or the pet, a cloth, or another object. However, the non-living thing is not limited to them. Furthermore, the subject may be the living thing or non-living thing wearing the cloth.

Furthermore, the cloth is an article wearable by the subject. For example, the cloth is a coat, a skirt, trousers (pants, slacks), shoes, or a hat.

According to the first embodiment, irrespective of the user's direction, the fitting image which the cloth image is compounded with the photographing image of the user can be generated without uncomfortable feeling for the user.

(Modification)

Figure 8:
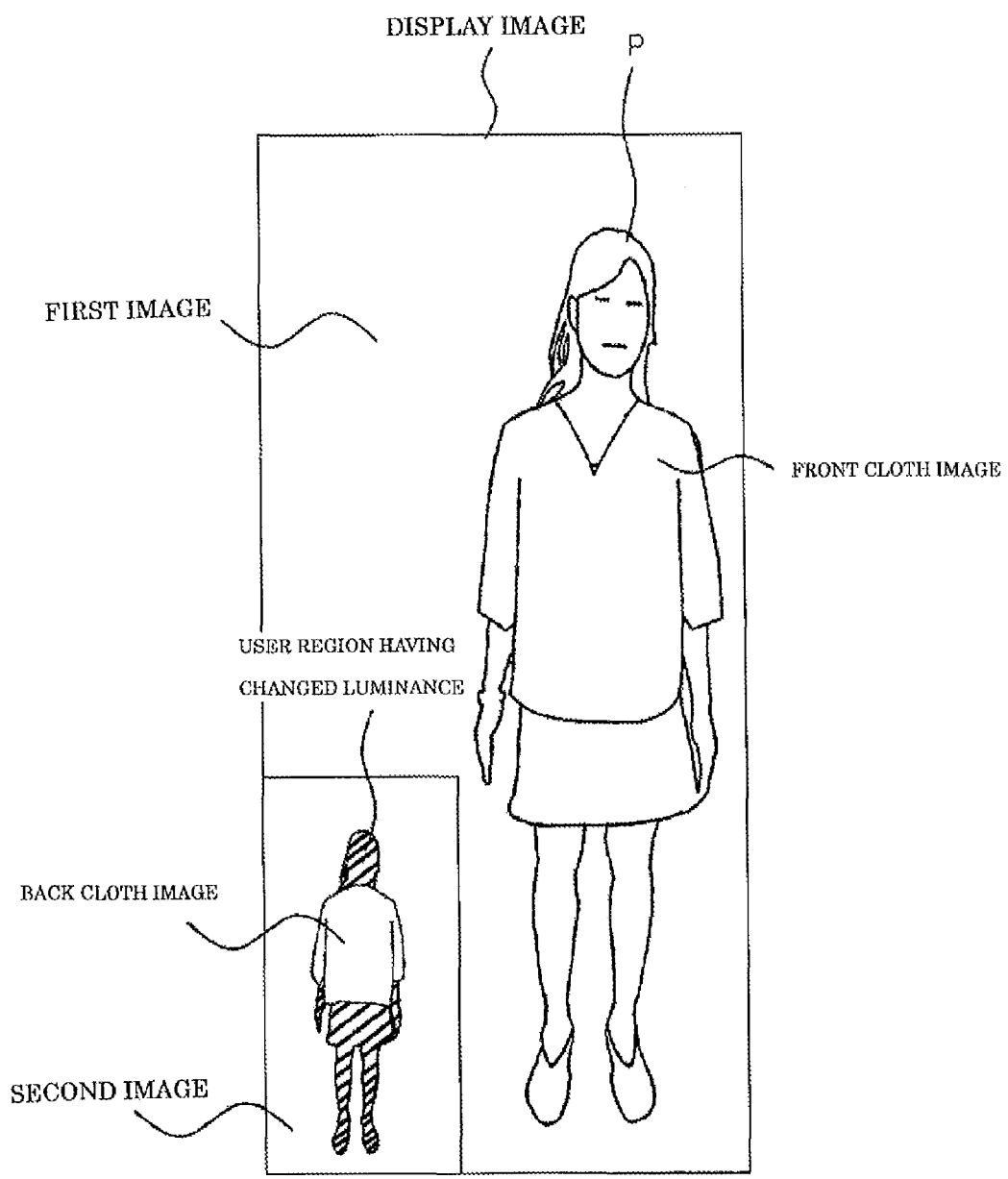
FIG. 8 is one example of a display image displayed by a display unit in FIG. 2.

FIG. 8 is one example of the display image displayed by the display unit 4. As shown in FIG. 8, the display unit 4 simultaneously displays a first image which a front cloth image is compounded with a photographing image of a user P frontally facing, and a second image (above-mentioned fitting image) generated according to the first embodiment.

Here, the second image is generated in the same way as above-mentioned processing of the first embodiment. As to the first image, the change unit 14 does not change a luminance of a user region.

By the user P's input operation, the selection unit 15 selects a back cloth image and a front cloth image mutually corresponded from the storage unit 51, and extracts them.

The composition unit 16 generates the first image by compounding the front cloth image (extracted) with the photographing image of the user P frontally facing. Furthermore, the composition unit 16 generates the second image by compounding the back cloth image (extracted) with a photographing image in which a luminance of the user region is changed. The composition unit 16 supplies the first image and the second image to the display unit 4. The display unit 4 simultaneously displays the first image and the second image.

According to this modification, the user can simultaneously observe the first image (front fitting image) and the second image (back fitting image).

Moreover, among the first image and the second image, the display unit 4 may change a luminance of any of background regions (except for the user region). As a result, uncomfortable feeling that the first image and the second image include the same background region can be reduced.

The Second Embodiment

In the second embodiment, an image processing apparatus 5 generates a fitting image by compounding a back cloth image corresponding to a direction of the user P included in the photographing image. This feature is different from the first embodiment.

Figure 9:
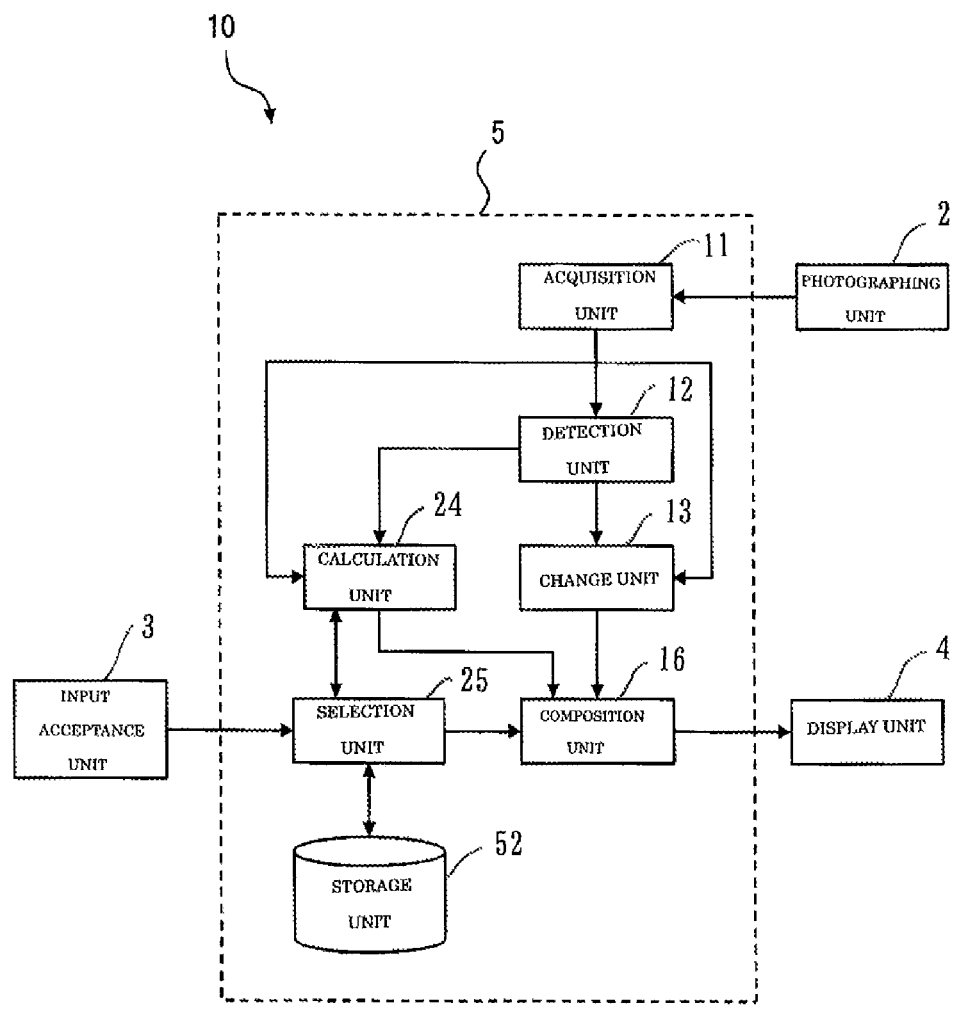
FIG. 9 is a block diagram of an image processing apparatus 5 according to the second embodiment.

FIG. 9 is a block diagram of the image processing apparatus 5. In the image processing apparatus 5 in comparison with the image processing apparatus 1, the calculation unit 14 is replaced with a calculation unit 24, the selection unit 15 is replaced with a selection unit 25, and the storage unit 51 is replaced with a storage unit 52. Hereinafter, the calculation unit 24, the selection unit 25, and the storage unit 52, will be explained.

The calculation unit 24 calculates a position and a direction of the user region included in the photographing image. For example, by face detection technique, the calculation unit 24 may calculates a direction of the user P's face as a direction of the user region. Furthermore, from a difference between the user P's right shoulder region and left shoulder region along top and bottom direction, a direction of the user region may be calculated. Furthermore, by using a distance sensor (not shown in FIG. 9) able to measure a distance from the virtual fitting system 10 to the user P, from a difference between a distance to the user P's right shoulder region and a distance to the user P's left shoulder region, a direction of the user region may be calculated.

Figure 10:
FIG. 10 is one example of image data stored in a storage unit 52 in FIG. 9.
Figure 10:
Figure 10:
Figure 10:
Figure 10:

FIG. 10 is one example of image data stored in the storage unit 52. As shown in FIG. 10, the storage unit 52 stores cloth images in correspondence with "direction" except for "front" (0°) and "back" (180°). Here, in the second embodiment, for example, the cloth image of which direction is not (180°) but (150°) is called "back cloth image". Namely, the back cloth image of the second embodiment may be an image from which a back part of cloth can be observed.

Among cloth images having the same trade name selected by the user P's designation, the selection unit 25 selects and extracts a back cloth image corresponding to a direction of the user P calculated by the calculation unit 24. For example, a back cloth image of which direction is opposite to a direction of the user P may be selected and extracted.

According to the second embodiment, irrespective of the direction of the user P, a fitting image having the cloth image compounded without uncomfortable feeling can be generated.

Moreover, for example, the image processing apparatus of above-mentioned embodiments can be realized by using a general purpose computer as basic hardware. Namely, the acquisition unit 11, the detection unit 12, the change unit 13, the calculation unit 14 (24), the selection unit 15 (25), and the composition unit 16, can be realized by making a processor (loaded onto this computer) execute a program. Here, the image processing apparatus may be realized by previously installing the program into this computer. Alternatively, the program is stored into a memory device such as CD-ROM or distributed via a network. By suitably installing this program into the computer, the image processing apparatus may be realized. Furthermore, the acquisition unit 11, the detection unit 12, the change unit 13, the calculation unit 14 (24), the selection unit 15 (25), the composition unit 16, and the storage unit 51 (52), can be realized by suitably utilizing a memory, a hard disk, or a storage medium (such as CD-R, CD-RW, DVD-RAM, DVD-R and so on) incorporated into or externally attached onto the general purpose computer. Furthermore, the storage unit 51 (52) may be set up on a server of the network.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for processing an image, comprising
a computer processor; and
hardware storage communicatively coupled to the computer processor, the hardware storage storing a program that, when executed by the computer processor, causes the computer processor to perform operations comprising:
acquiring a photograph image of a user;
detecting a user region from the photograph image, and deciding a user's direction in the user region by detecting a face region of the user from the photograph image;
if the user's direction is forward-facing and if a back side image of a garment is to be compounded with the user region, acquiring a changed image by changing the photograph image to an image from which the user's direction in the user region cannot be decided;
calculating a position of the user region in the photograph image; and
compounding the back side image of the garment with the user region in the changed image at the calculated position.

2. The apparatus according to claim 1, wherein
the changed image is acquired by changing a luminance of the user region in the photograph image.

3. The apparatus according to claim 2, wherein
the changed image is acquired by executing single-colorization of the user region in the photograph image.

4. The apparatus according to claim 3, wherein:
the hardware storage is configured to store a plurality of back side images of garments; and the apparatus further comprises:
a selection device configured to select and extract a back side image of a garment from the hardware storage, based on input to the selection device.

5. The apparatus according to claim 4, wherein
the position of the user region in the photograph image is calculated based on a kind of garment selected according to input to the selection device.

6. A method for processing an image, comprising:
acquiring a photograph image of a user;
detecting a user region from the photograph image;
deciding a user's direction in the user region by detecting a face region of the user from the photograph image;
if the user's direction is forward-facing and if a back side image of a garment is to be compounded with the user region, acquiring a changed image by changing the photograph image to an image from which the user's direction in the user region cannot be decided;
calculating a position of the user region in the photograph image; and
compounding the back side image of the garment with the user region in the changed image at the calculated position.

7. A non-transitory computer readable medium storing a program that, when executed by a computer, causes the computer to perform operations for processing an image, the operations comprising:
acquiring a photograph image of a user;
detecting a user region from the photographing image;
deciding a user's direction in the user region by detecting a face region of the user from the photograph image;
if the user's direction is forward-facing and if a back side image of a garment is to be compounded with the user region, acquiring a changed image by changing the photograph image to an image from which the user's direction in the user region cannot be decided;
calculating a position of the user region in the photograph image; and
compounding the back side image of the garment with the user region in the changed image at the calculated position.

* * * * *